(12) United States Patent
Harif et al.

(10) Patent No.: US 6,581,110 B1
(45) Date of Patent: Jun. 17, 2003

(54) METHOD AND SYSTEM FOR READING AND PROPAGATING AUTHENTICATED TIME THROUGHOUT A WORLDWIDE ENTERPRISE SYSTEM

(75) Inventors: Shlomi Harif, Austin, TX (US); Robert Dennis Hodges, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/455,703

(22) Filed: Dec. 7, 1999

(51) Int. Cl.[7] ............................................... G06F 15/16
(52) U.S. Cl. ..................... 709/248; 709/400; 713/202
(58) Field of Search ........................... 709/248, 400; 713/400, 201, 202; 370/350

(56) References Cited

U.S. PATENT DOCUMENTS

| | | | | |
|---|---|---|---|---|
| 5,471,631 A | * | 11/1995 | Beardsley et al. | 702/178 |
| 5,600,632 A | * | 2/1997 | Schulman | 340/2.7 |
| 5,784,421 A | | 7/1998 | Dolev et al. | 375/354 |
| 5,790,805 A | * | 8/1998 | Bantum | 709/248 |
| 6,023,769 A | * | 2/2000 | Gonzalez | 713/400 |
| 6,158,010 A | * | 12/2000 | Moriconi et al. | 709/223 |
| 6,199,169 B1 | * | 3/2001 | Voth | 709/248 |
| 6,199,170 B1 | * | 3/2001 | Dietrich | 713/400 |
| 6,215,862 B1 | * | 4/2001 | Lopes | 379/102.01 |
| 6,226,372 B1 | * | 5/2001 | Beebe et al. | 379/145 |
| 6,311,283 B1 | * | 10/2001 | Gonzalez | 713/400 |
| 6,324,586 B1 | * | 11/2001 | Johnson | 342/352 |
| 6,393,126 B1 | * | 5/2002 | van der Kaay et al. | 380/239 |

OTHER PUBLICATIONS

David Mills, Network Time Protocol (Version 3) Specification, Implementation and Analysis, Network Working Group, RCF–1305 Mar. 1992, whole reference.*

* cited by examiner

Primary Examiner—Mehmet B. Geckil
(74) Attorney, Agent, or Firm—Duke W. Yee; Leslie A. Van Leeuwen; Catherine K. Kinslow

(57) ABSTRACT

A method and system for reading and propagating accurate time in a worldwide enterprise system through a hierarchical network of time servers, with a single time source at the top of the pyramid, and time source clients at the base. Single source time synchronization is assured by starting with an atomic clock receiver connected to a time source computer. Primary time servers next in the hierarchy access the source to obtain accurate time information. Clients access higher time servers to obtain time information. Time servers operate as multiple hierarchical layers between the clients and the time source, limiting the load on any single server and providing redundant paths to a valid time source. Time servers unable to verify their time through the primary, alternate, or failover servers invalidate themselves, thereby preserving system integrity.

29 Claims, 6 Drawing Sheets

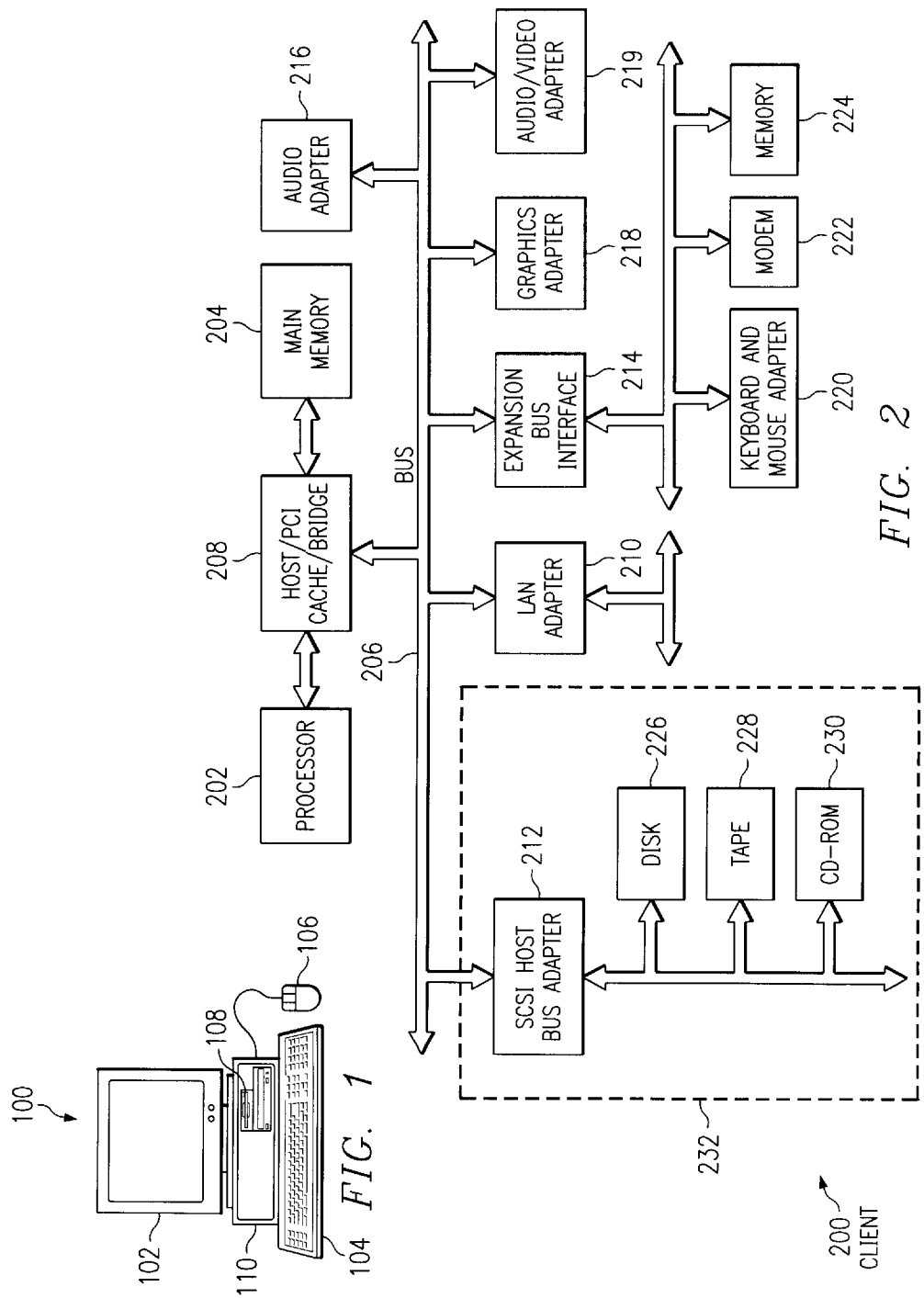

METHOD AND SYSTEM FOR READING AND PROPAGATING AUTHENTICATED TIME THROUGHOUT A WORLDWIDE ENTERPRISE SYSTEM

BACKGROUND OF THE INVENTION

1. Technical Field

The present invention relates generally to the field of network architecture and administration, and more particularly to the synchronization of internal times to a reference time source.

2. Description of Related Art

Large network enterprises spanning multiple time zones or enterprises requiring accurate date stamping on their records and transactions look to a single solution for their enterprise management. Alongside software distribution, distributed monitoring, user administration and security management, time synchronization is important glue for the far-flung organization. Keeping consistent time across the enterprise is not only a good idea but is also a necessity for many applications as illustrated by the following examples:

Example 1: An online trading office with day traders working out of their homes needs to ensure that transactions sent for processing are correctly time stamped. The stamps function as an audit for how long a transaction takes to enter, which may be another indication of data manipulation or hacking.

Example 2: A casino needs to monitor transactions received from machines to ensure data integrity.

Example 3: An IT organization needs to make sure that all machines are working from the same time source, regardless of geography. A breakdown on synchronization indicates either data degradations on lines not under their control, or power faults requiring remediation.

A file server in a network timestamps a write to a file with a current time obtained from the server's clock. A problem is encountered when a server's clock has a substantially different time than the client's clock. The problem is that applications running on the client computer can produce errors when, for example, a file is read or accessed with a timestamp ten minutes into the future.

Another problem is that a comparison of log entries can be complicated when clients with clocks that differ by minutes are logging to the same host. Attempting to chain together a sequence of events while looking at these logs is often futile due to the inaccurate timestamps.

In an effort to solve this problem, the Network Time Protocol (NTP) has been developed. NTP provides mechanisms to synchronize time and coordinate time distribution in a large, diverse internet. The protocol uses a returnable-time design in which a distributed subnet of time servers operating in a self-organizing, heirarchical master/slave configuration synchronizes local clocks within a subnet to national time standards by wire or radio. NTP relies on access to an accurate timekeeping device. The protocol can provide amazingly accurate synchronization between clients and the timekeeper. Across a LAN, accuracies are usually within milliseconds. Within WANs, the accuracy may degrade to tens of milliseconds. However, this is as accurate as most applications need.

The basic philosophy of NTP is that there is a universal notion of time to which all machines should synchronize: Universal Coordinated Time (UTC). Rather than trying to synchronize one host with another, each NTP server attempts to synchronize with UTC independently through the best sources of information a particular server can access.

The NTP servers are structured in a hierarchy rather than in a flat space or in a cloud. Each server assigns itself a hierarchy level that corresponds with its distance from a UTC source. Servers at the highest hierarchy level (level 1) have direct access to a source for UTC time, such as a radio receiver. Servers at hierarchy level 2 receive time information from level 1 servers, while level 3 servers receive time information from level 2, and so on. The number of levels is limited to 15 in the RFC-1305 standard.

An NTP host can operate as both a client and a server. Typically, an NTP client will synchronize with one server. The choice of server depends on a number of factors, including hierarchy level, measured network delay, and claimed precision. However, if three or more servers are available, the client employs a voting algorithm to ensure its server of choice is not providing an obviously incorrect time value.

As a client, an NTP host synchronizes with other servers. As a server, it permits other NTP hosts to synchronize with itself. There are two types of association modes between NTP hosts. In a client-server association, the client only receives time information from the server. In the symmetric-active mode, each NTP host acts as a server to the other and the two hosts exchange time information. The typical arrangement for a pool of time servers is for each to use a symmetric-active association with the others in the pool and to use a client association with at least three lower-hierarchy servers. The most robust configuration would have each server use a client association with a different set of three lower-hierarchy servers.

User workstations typically will not be slated for the role of NTP server but will be configured to use a client association with each NTP server in the pool. Client-only hosts also can be configured to receive synchronization information via broadcast or multicast packets. In a network of 100 clients and three time servers, for example, there are more than 300 associations and packet exchanges. If the time servers simply broadcast time information, the amount of traffic required to maintain the 100 clients reduces dramatically. Although the broadcast method decreases accuracy, the decrease in accuracy is not significant for most applications.

Although a standard for time synchronization has previously been disclosed, there remains a need for a mechanism to implement the standard into various platforms. There is a particular need for software that is cross-platform compatible to ensure compatibility within an enterprise. The software should be capable of being integrated into current network management systems such that the tools of the management system are utilized and the cost of implementing the solution is minimized. Furthermore, the system should provide authentication/certification capabilities based on the time synchronization and should interface the authentication functions with applications in order to assure integrity of operations.

SUMMARY OF THE INVENTION

The present invention keeps all servers and clients in an enterprise updated to the correct time through a hierarchical network of time servers, with a single time source at the top of the pyramid, and time source clients at the base.

Single source time synchronization is assured by starting with an atomic clock receiver connected to a time source computer. This source is accessed by the primary time servers beneath it to obtain accurate time information. Clients access the highest time server to obtain time information. If all of the time servers are unavailable, then the time information is obtained from the next lowest level of servers.

Time servers operate as multiple hierarchical layers between the clients and the time source, limiting the load on any single server and providing redundant paths to a valid time source. Time servers unable to verify their time through the primary, alternate, or failover servers invalidate themselves, thereby preserving system integrity.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented in accordance with a preferred embodiment of the present invention.

FIG. 2 is a block diagram illustrating a data processing system in which the present invention may be implemented.

DETAILED DESCRIPTION OF THE PREFERRED EMBODIMENT

Figure 3:
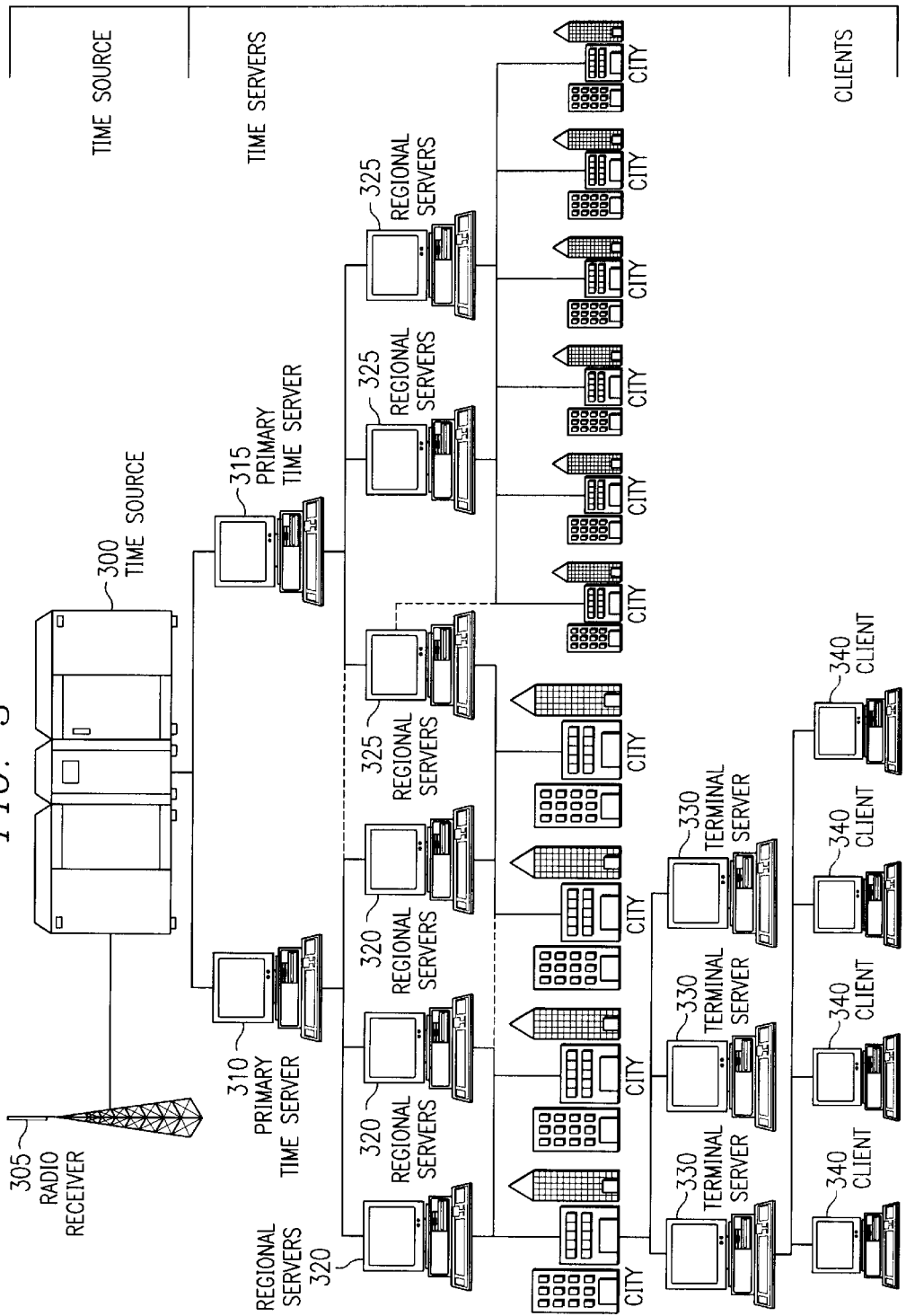
FIG. 3 is a tree diagram of the hierarchy architecture of an enterprise in a preferred embodiment of the invention.

With reference now to the figures and in particular with reference to FIG. 1, a pictorial representation depicting a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics port (AGP) and Industry Standard Architecture (ISA) may be used. processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Referring now to FIG. 3, a tree diagram of the hierarchy architecture of an enterprise in a preferred embodiment of the invention is shown. At the top of the tree, a time source computer 300 is connected to a radio receiver 305 which receives a signal from a source transmitting an accurate time reference. The time source computer 300 may also be connected to a sister time source computer (not shown) for synchronization when radio receiver 305 is inoperative for some reason. Primary time servers 310, 315 are connected to the time source 300 and periodically synchronize their internal time to the time source 300. Regional servers 320, 325 are connected to the primary time servers 310, 315. The regional servers 320, 325 are connected such that if primary time server 310 in the left branch of the network is busy or inoperative, the primary time server 315 in the right branch may be accessed even though the regional server is not a direct descendant of the primary time server 315. The regional servers 320, 325 may serve a particular geographic region, a city, or a group of cities, depending on the number of terminal servers and clients contained in the region, city, or group of cities. Within each region, there are a number of terminal servers 330, 335 which are connected to the regional server for that region.

The terminal servers in FIG. 3 are shown only for one regional server, although all of the other regional servers would also have terminal servers attached as well. The terminal servers are also connected to other regional servers to allow other regional servers to be accessed when the regional server associated with a particular terminal server is unavailable. The lowest level of the hierarchy contains the clients 340 which are connected to a terminal server 330. The clients 340 may also be connected to other terminal servers 335 in the case that the particular terminal server 330 associated with the clients 340 is busy when a request is made.

The servers shown in FIG. 3 may contain different platforms or operating systems from which the server runs. The present invention allows the internal time of each server to be synchronized regardless of the platform of the server. In addition, the method of connecting the network may be any method of connection used by one skilled in the art to form a network. In a preferred embodiment, the network components of the enterprise have TCP/IP stacks installed and available for communication of data. However, the invention is not limited to this particular method of data communication.

The present invention comprises an NTP compliant software module that is implemented into the time source 300, each server, and each client. Preferably, the time source 300 is an IBM 3090 running OS/390, but the time source is not limited to this particular server. A preferred embodiment has three modes of operation: time generator, time server, and time client. In the time generator mode, the time is retrieved from an atomic clock source 305 by the time source 300. In the time server mode, a server updates its time at a specified interval. This is accomplished by identifying a server that is available for synchronization. In a preferred embodiment, this is done using a "TMR policy region." This is a functional component of the Tivoli enterprise management software. Servers are identified as network resources, and can be accessed or addressed individually or through a group with which the server is affiliated. The server is then synchronized with the server identified by the TMR policy region. Once synchronization is accomplished, the server may pass on time information to a server or client that requests time synchronization.

In the time client mode, the client broadcasts a request for time. The request is then answered by any available time server which is listening to the network subnet in which the client is located. While FIG. 3 shows a particular embodiment with 5 hierarchy levels, the invention is not limited to any particular number of hierarchy levels, or any particular number of time sources, servers, or clients. The invention is scalable to fit any network architecture with any number of components. FIG. 3 is provided for illustrative purposes only and is not intended to limit the application of the invention to other network structures.

Figure 4:
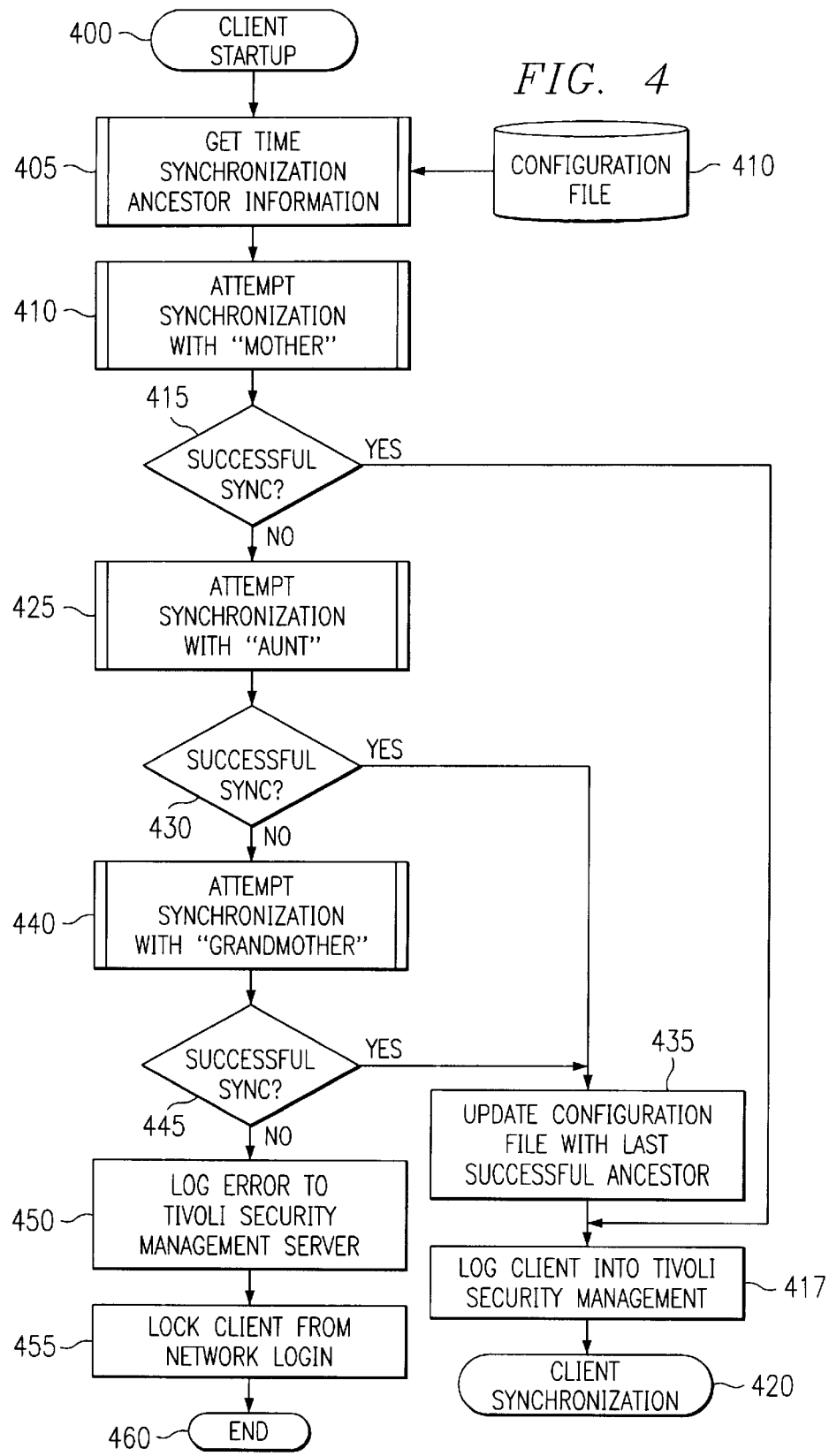
FIG. 4 is a flowchart of a preferred embodiment of the invention in the client startup mode of the time client mode.

Referring now to FIG. 4, a flowchart of a preferred embodiment of the invention in the client startup mode of the time client mode is illustrated. Beginning at step 400, the client attempts to log in to the network. Time synchronization ancestor information is obtained from a configuration file 410 at step 405. This file is contained on the time server for that client and a copy is retrieved from the server each time a client attempts to synchronize itself. This prevents a hacker from modifying the configuration file. If a "mother" server is available, that is a server which is directly above the client in the hierarchy, then an initial synchronization with the mother is attempted at step 410. If the synchronization process is successful at step 415, then the client is logged in to the management system at step 417. The client then performs the management functions desired and the client is periodically re-synchronized at step 420 as described below in reference to FIG. 5.

However, if initial synchronization with the mother is not successful at step 415, then an attempt to synchronize the client with an "aunt" server is made at step 425. An aunt server is a server which is located in the same family and hierarchy level of servers as the mother, but of which the client is not a direct descendant. If the synchronization with the aunt is successful at step 430, then the configuration file for the client is updated with the last successful ancestor at step 435, and the client is logged in to the management system at step 415.

If synchronization with the aunt is not successful at step 430, then an attempt to synchronize the client with a "grandmother" server is made at step 440. A grandmother server is a server which is located in the same line, two levels removed from the client. If the synchronization with the grandmother is found to be successful at step 430, then the configuration file is updated with the last successful ancestor at step 435, and the client is logged in to the management system at step 415.

If synchronization with the grandmother fails as well, then an error is logged to the management system at step 450, and the client is locked from logging in to the network at step 455. Then the login process ends at step 460. However, in other embodiments of the invention, an attempt is made to synchronize the client with other servers in the network tree. Thus, the integrity of the time stamps on various operations is assured because the client is not allowed to log in unless the internal time is properly synchronized. In another embodiment of the invention, the client is allowed to log in to the network despite being unable to synchronize its internal time. However, the management system would place a flag on all operations performed by the client to indicate to the management system that the client has not been authenticated. Thus, the client may be logged on without synchronization and the problem of inaccurate time stamps is avoided by the use of the flags.

Figure 5:
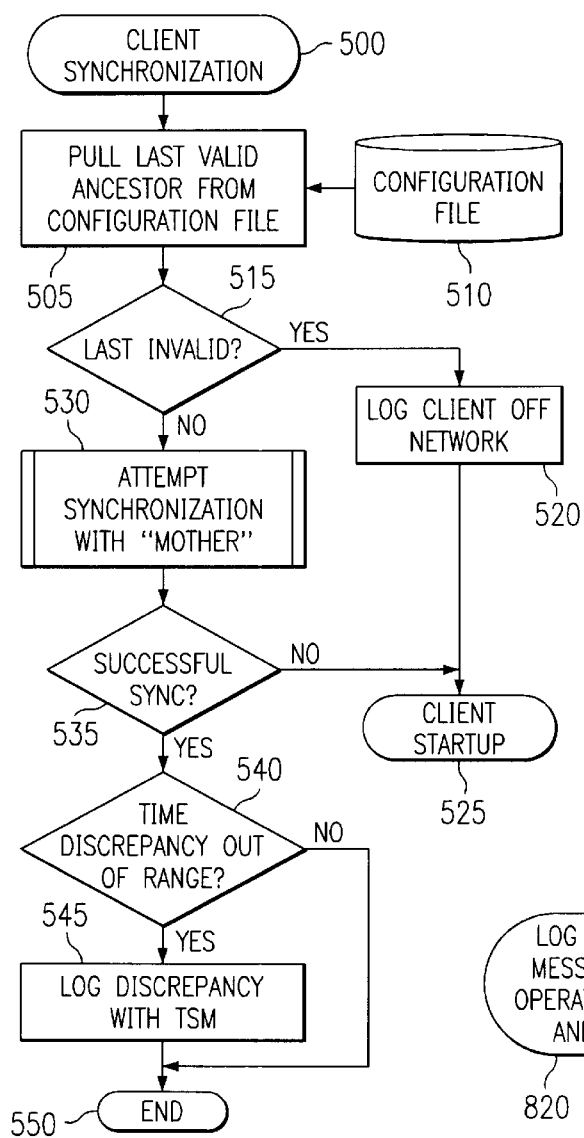
FIG. 5 is a flowchart of a client synchronization mode of the time client mode of a preferred embodiment of the invention.

Once the client is logged into the management system, the internal time of the client is periodically synchronized. Referring now to FIG. 5, a flowchart of a preferred embodiment of the invention in the client synchronization mode of the time client mode is shown. The synchronization process begins at step 500 when a synchronization request is made by the client. The last valid ancestor is retrieved from the configuration file 510 at step 505. Then a determination is made as to whether the last valid ancestor stored in the configuration file is still valid at step 515 by attempting a time synchronization with the last valid ancestor. If the ancestor returns an authenticated time in response to the attempted time synchronization, then the ancestor is still valid. If the ancestor is invalid at step 515, the client is logged off the network at step 520 and the startup process is repeated at step 525. Step 525 represents the startup process shown in FIG. 4.

If the last ancestor is still valid at step 515, then an attempt is made to synchronize the client with the mother time server at step 530. Synchronization with the mother is always attempted first in order to avoid overloading the ancestors with time synchronization requests. If the synchronization process with the mother is successful at step 535, then the time discrepancy that exists between the mother and the client is compared to a predefined range at step 540. If the discrepancy is out of range, then the discrepancy is logged with the management system at step 545, and the synchronization process ends at step 550. The reason that the discrepancy is logged is that the time discrepancy may represent a security breach. Logging the discrepancy does not mean that the synchronization process was unsuccessful, however, but only that there may be a potential security breach. No log is made if the discrepancy is not out of range at step 540. If synchronization with the mother is not successful at step 535, then the client startup process is repeated at step 525.

Figure 6:
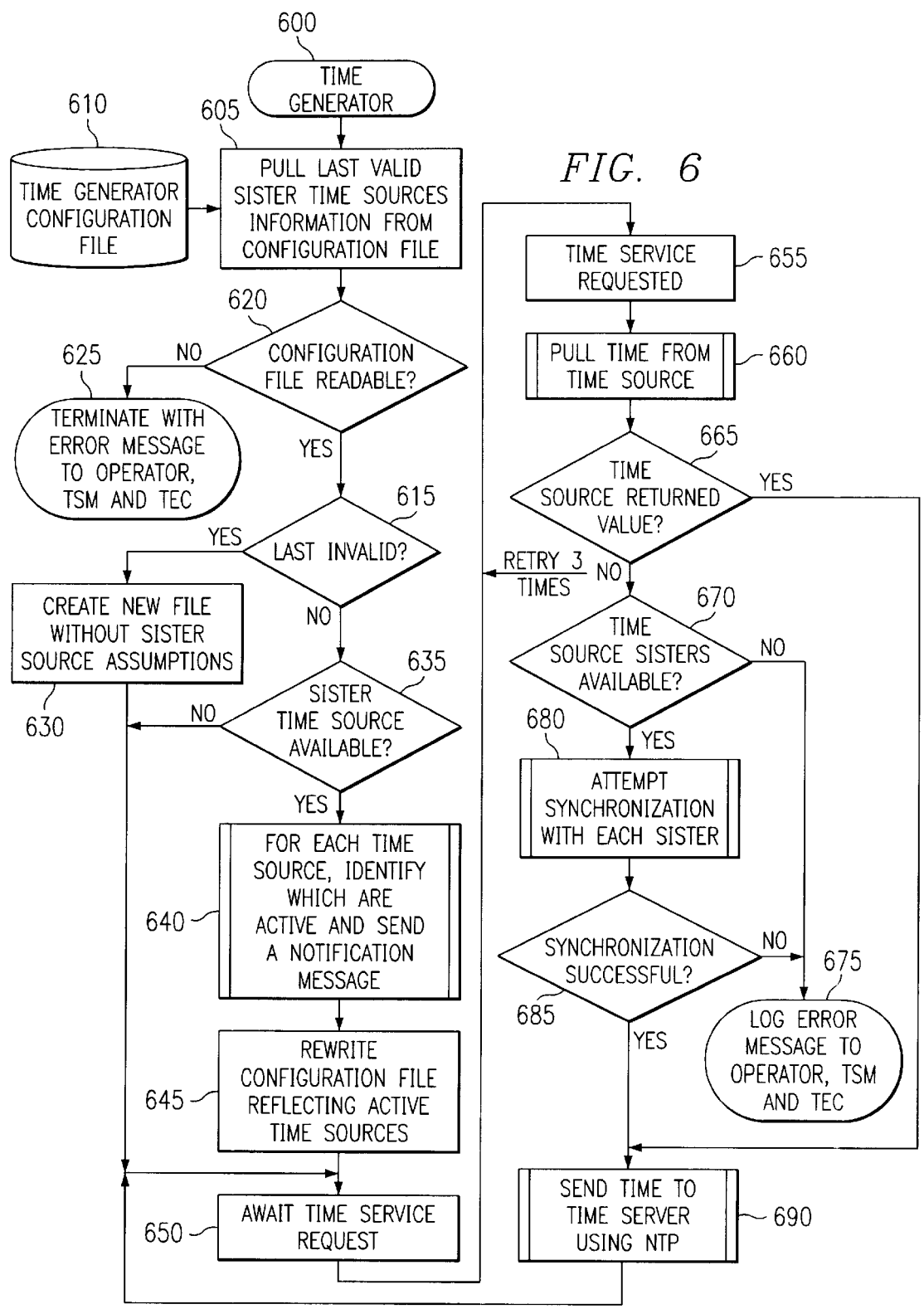
FIG. 6 is a flowchart of the time generator mode of a preferred embodiment of the invention.

Referring now to FIG. 6, a flowchart of the time generator mode of a preferred embodiment of the invention is illustrated. Starting at step 600, the time generator mode is entered. The first step in the time generator mode is to pull the last valid sister time sources information from the configuration file 610 located on the time generator server at step 605. If the configuration of the file is not readable at step 620, then the process is terminated and an error message may be sent to the operator, Tivoli System Management (TSM), and the Tivoli Enterprise Console (TEC) at step 625. The Tivoli System Management is the software determined to be appropriate to receive communications regarding the time synchronization issues. The software could be Tivoli Distributed Monitoring, Tivoli Global Enterprise Manger, Tivoli Expert Advisor, Tivoli Service Desk, etc, which are all available from Tivoli Systems, Inc. If the configuration file is readable at step 620, then the last valid sister time sources in the configuration file are checked to determine if they are still valid at step 615 by attempting a synchronization with the sister time source.

If all of the last valid sister time sources pulled from the time generator configuration file 610 are invalid at step 615, then a new configuration file is created which does not contain sister source assumptions at step 630. A sister source assumption is a sister time source which is referenced in the configuration file as an active time source. At step 635, the time generator checks the availability of sister time sources. If no other sister time sources are available, then the process moves to step 640 and the server awaits a time service request from a client or from a sister time source. However, if there are sister time sources available at step 635, then each sister time source that is active is identified and a notification message is sent to each active sister time source to enable the sister time source to make a time service request to the time generator at step 640. The configuration file on the time generator is rewritten to reflect active sister time sources at step 645. The time generator then awaits service requests by a sister time server or a client at step 640. Note that the term "client" as used here could also refer to a server which is immediately below the time generator in the hierarchy, but which is requesting time synchronization with the time generator.

At step 655, a time service request is received by the time generator. An attempt is made to retrieve the time from the time source at step 660. The time source in a preferred embodiment is an atomic radio clock or some other customer-specified time input device. If a time value is returned by the time source to the time generator at step 665, then the time value is sent to the time server that requested the time service using Network Time Protocol (NTP) at step 690. The time generator then awaits the next time service request at step 650.

If the time source did not return a value at step 665, then another attempt is made at step 660 to retrieve a value from the time source. This process is repeated three times until a time value is returned. If a value is not returned at step 665 after three retries, then the time generator determines if another sister time source is available at step 670. If there are no sister time sources available, then an error message is logged to the operator, TSM, and TEC at step 675. However, if there are sister time sources available at step 670, then an attempt is made to synchronize with each sister at step 680. If the synchronization is successful at step 685, then the time value retrieved from the sister at step 680 is sent to the requesting time server using NTP at step 690. If the synchronization is not successful at step 685, then an error message is logged to the operator, TSM, and TEC at step 675.

Figure 7:
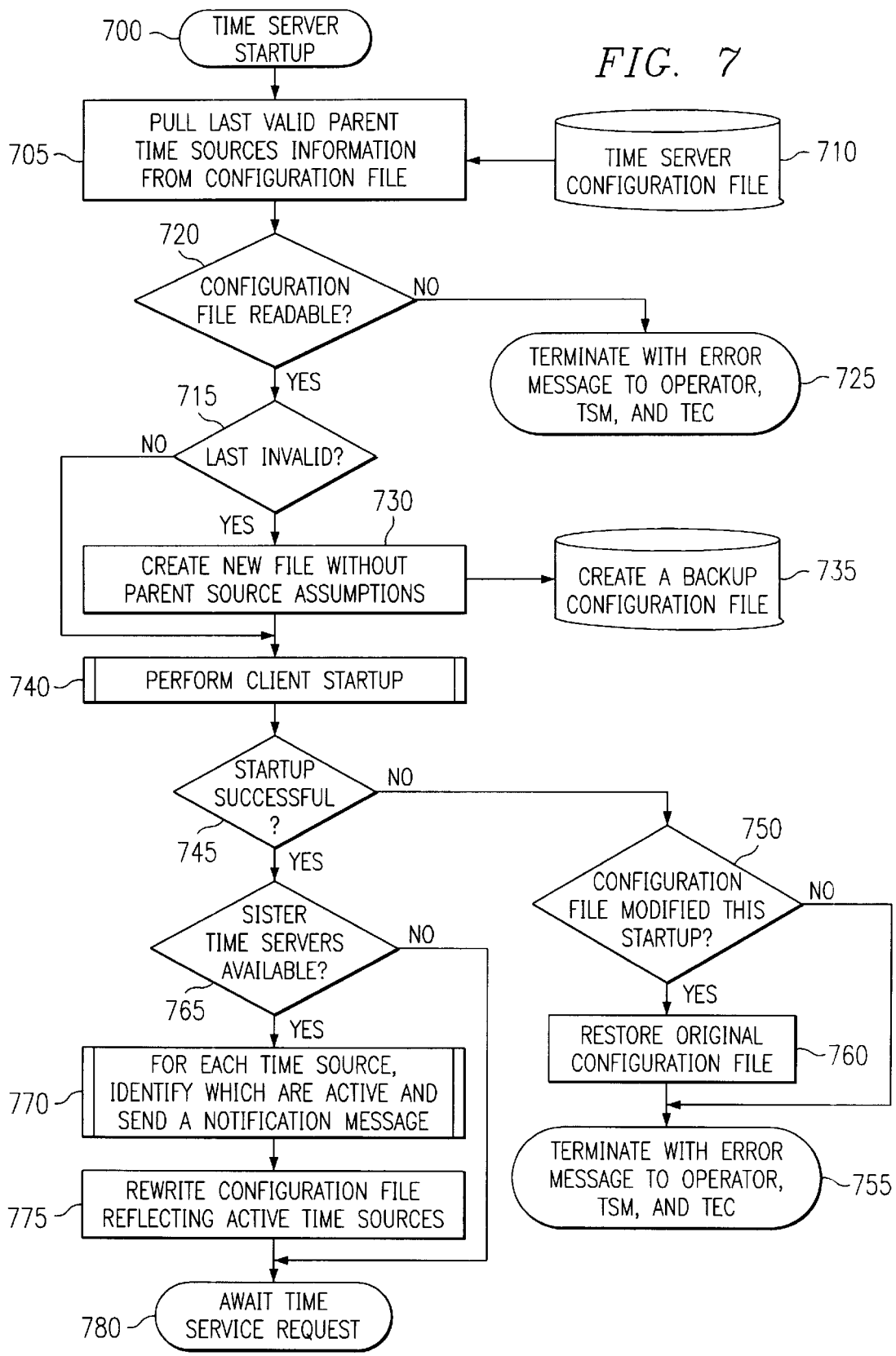
FIG. 7 is a flowchart of the time server startup mode of a preferred embodiment of the invention.

Referring now to FIG. 7, a flowchart of the startup mode of the time server mode of a preferred embodiment of the invention is illustrated. This mode is entered whenever the time server is logged into the management system. Starting at step 700, the time server startup mode is entered. The time server retrieves the last valid parent time sources from the time server configuration file 710 at step 705. The configuration file is checked to see if it is readable at step 720 by attempting a read of the file. If the configuration file is not readable at step 720, the process is terminated with an error message to the operator, TSM, and TEC at step 725.

If the last valid parent time source retrieved from the time server configuration file at step 705 is currently valid at step 715, then the client startup mode is entered at step 740. Attempting a time synchronization is used to determine if the last valid parent time source is currently valid. If the synchronization attempt is successful, then the source is still valid. The client startup mode of step 740 is equivalent to the client startup illustrated by FIG. 4. Thus, the same software which is used in the client for startup may also be used in the time server for startup.

If the last valid parent time source is invalid at step 715, then a new configuration file is created which does not contain parent source assumptions at step 730. The client startup procedure of FIG. 4 is performed at step 740. If the startup is not successful at step 745, then if the configuration file was modified at step 730 during this startup procedure, the original configuration file is restored at step 760 and the procedure is terminated with an error message to the operator, TSM, and TEC at step 755. If the configuration file has not been modified, then the procedure simply terminates with an error message because there is no original configuration file to restore.

If the startup is successful at step 745, then the time server searches for sister time servers available for synchronization at step 765. If there are sister time servers available, then for each sister time source a determination is made as to whether the time source is active. If the time source is active, then a notification message is sent to the sister time source to indicate that the present time server is active at step 770. Then the configuration file is re-written to reflect the current active sister time sources at step 775. The time server awaits time service requests from clients or sister time servers at step 780. If there are no sister time servers available at step 765, then there is no need to identify the active servers.

Figure 8:
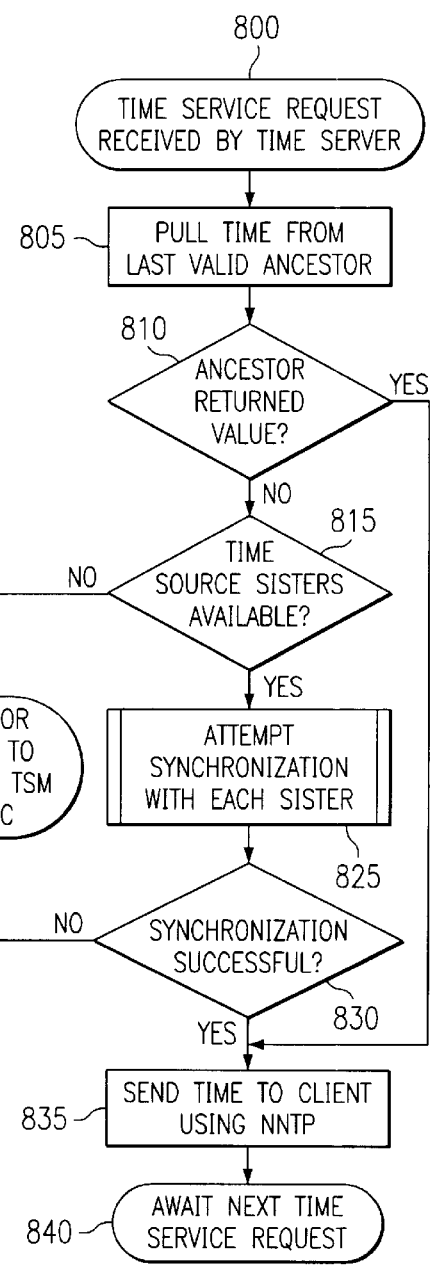
FIG. 8 is a flowchart of the time server synchronization mode of a preferred embodiment of the present invention.

Referring now to FIG. 8, a flowchart of the time server synchronization mode of a preferred embodiment of the invention is illustrated. At step 800, a time service request is received by the time server from a client or a sister time server. Upon receiving a time service request, the time server attempts to retrieve a time value from the last valid ancestor at step 805. If the ancestor returns a value at step 810, then the time is sent to the client using NTP at step 835. The time server then awaits the next time service request at step 840.

If the ancestor does not return a value at step 810, then the time server determines whether time source sisters are available to retrieve the time at step 815. If there are no sister time sources available, then an error message is logged to the operator, TSM, and TEC at step 820. However, if there are sister time sources available at step 815, then an attempt is made to synchronize with the sister time sources at step 825. If none of the synchronization attempts are successful at step 830, then an error message is logged to the operator, TSM, and TEC at step 820. If one of the synchronizations is successful at step 830, then the time is sent to the client or the sister server that requested the time service using NTP at step 835. The time server then awaits the next time service request at step 840.

In a preferred embodiment, the management system referenced above is the Tivoli Enterprise Console (TEC) available from Tivoli Systems, Inc. The present invention deals with an automatic authentication/lockout function as described above. However, time synchronization information may also be transmitted to the TEC for further correlation or action depending on what the user wants to do with the information beyond automatic authentication/lockout functions. In the preferred embodiment, the power of management systems is merged with single-source time synchronization using an RFC-1305 compliant protocol. Global accuracy of at least ±10 seconds may be obtained when the invention is implemented on properly powered computers connected to the time source through validated time servers.

There is no required or favored platform for any software component of the invention. The software may be implemented on any platform including an IBM 3090 running OS/390, RISC/6000, and Windows NT. The software agent residing on endpoints is cross-compiled for the target operating system. Some operating systems will require additional code when there are known timing problems (such as certain versions of SUN OS and hardware). Time servers in the present invention are cross-platform and may be used to serve heterogeneous networks. Each heterogeneous system (as in a WAN or LAN for a given region or company) has a top-level server for that area, linking back up into a parent server or the primary server. This top-level server may fan out time authentication to other servers in that area.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs, and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method of security management in a computer network to insure proper operation of applications comprising the following steps:

attempting a first time synchronization for a client with a server in a next higher hierarchy level; and logging the client into a management system if the first time synchronization is successful.

2. The method of claim 1 further comprising the step of preventing the client from logging in to the management system if the first time synchronization is unsuccessful.

3. The method of claim 1 further comprising:

logging the client into the management system if attempting the first time synchronization is unsuccessful; and attaching a flag to all operations performed by the client until a successful time synchronization is performed such that the flag warns that a time stamp has not been authenticated.

4. The method of claim 1 further comprising:

attempting a second time synchronization for the client with another server in the next higher hierarchy level if the first time synchronization is unsuccessful; and logging the client into the management system if the second time synchronization is successful.

5. The method of claim 4 further comprising:

attempting a third time synchronization for the client with a server in a hierarchy level above the next higher hierarchy level if the second time synchronization is unsuccessful; and logging a client into the management system if the third time synchronization is successful.

6. The method of claim 5 further comprising preventing the client from logging in to the management system if the steps of attempting the first time synchronization, attempting the second time synchronization, and attempting the third time synchronization are unsuccessful.

7. The method of claim 6 further comprising logging an error to the management system if the steps of attempting the first time synchronization, attempting the second time synchronization, and attempting the third time synchronization are unsuccessful.

8. The method of claim 1 further comprising the steps:
logging the client into the management system if the steps attempting the first time synchronization, attempting the second time synchronization, and attempting the third time synchronization are unsuccessful; and
attaching a flag to all operations performed by the client until a successful time synchronization is performed such that the flag warns that a time stamp has not been authenticated.

9. The method of claim 1 wherein the step of attempting the first time synchronization further comprises:
retrieving time synchronization ancestor information from a configuration file; and
storing the time synchronization ancestor information in the client.

10. The method of claim 1, wherein the step of attempting the first time synchronization conforms to a RFC-1305 standard.

11. A method of time synchronization in a computer network comprising the following steps:
retrieving a last valid server from a configuration file;
determining whether the last valid server is currently valid;
logging a client off the network if the last valid server is invalid; and
attempting synchronization with the last valid server if the last valid server is valid.

12. The method of claim 11 further comprising the steps:
determining whether a time discrepancy is out of range when the step attempting synchronization is successful; and
logging the discrepancy with a management system if the discrepancy is out of range.

13. The method of claim 11 wherein the step logging the client off the network further comprises initiating a startup procedure for the client.

14. The method of claim 11 wherein the last valid server is an ancestor.

15. The method of claim 11 wherein the method of time synchronization conforms to a RFC-1305 standard.

16. A system for synchronizing time in a computer network comprising:
a server;
a client connected to the server;
a management system for managing network operations;
a means for attempting the time synchronization; and
a means for logging the client into the management system if the time synchronization is successful.

17. The system of claim 16 further comprising a means for preventing the client from logging in to the management system if attempting the time synchronization is unsuccessful.

18. The system of claim 16 wherein the means for logging the client into the management system places a flag on an operation performed by the client if attempting the time synchronization is unsuccessful, wherein the flag indicates to a network application that the client has not been authenticated.

19. The system of claim 16 further comprising:
a means for retrieving a time from a time source; and
a means for sending an error message to the management system when the time synchronization is unsuccessful.

20. The system of claim 16 wherein the management system comprises a Tivoli Enterprise Console.

21. A computer program product in a computer readable medium for security management in a data processing system, the computer program product comprising:
an instruction for attempting a time synchronization between a client and a server; and
an instruction for logging the client into a management system if attempting the time synchronization is successful.

22. The computer program product of claim 21 further comprising an instruction for preventing the client from logging in to the management system if attempting the time synchronization is unsuccessful.

23. The computer program product of claim 21 further comprising:
an instruction for logging the client into the management system if attempting the time synchronization is unsuccessful; and
an instruction for attaching a flag to an operation performed by the client until a successful time synchronization is performed such that the flag indicates to a network application that a time stamp has not been authenticated.

24. The computer program product of claim 21 further comprising an instruction for logging an error to the management system if attempting the time synchronization is unsuccessful.

25. The computer program product of claim 21 wherein the instruction for attempting the time synchronization comprises:
an instruction for retrieving time synchronization ancestor information from a configuration file; and
an instruction for storing the time synchronization ancestor information in the client.

26. A computer program product in a computer readable medium for time synchronization in a data processing system, the computer program product comprising:
an instruction for retrieving a last valid server from a configuration file;
an instruction for determining whether the last valid server is currently valid;
an instruction for logging a client off the network if the last valid ancestor is invalid; and
an instruction for attempting synchronization the last valid ancestor if the ancestor is valid.

27. The computer program product of claim 26 further comprising:
an instruction for determining whether a time discrepancy is out of range when attempting synchronization is successful; and
an instruction for logging the time discrepancy with a management system if the time discrepancy is out of range.

28. The computer program product of claim 26 wherein the instruction for logging a client off the network further comprises an instruction for initiating a startup procedure for the client.

29. The computer program product of claim 26 wherein the computer program product conforms to a RFC-1305 standard.

* * * * *